Dec. 22, 1931.  A. E. BOTSFORD  1,837,526
STRAIGHT LINE IMPLEMENT COUPLING
Filed May 19, 1930   3 Sheets-Sheet 1
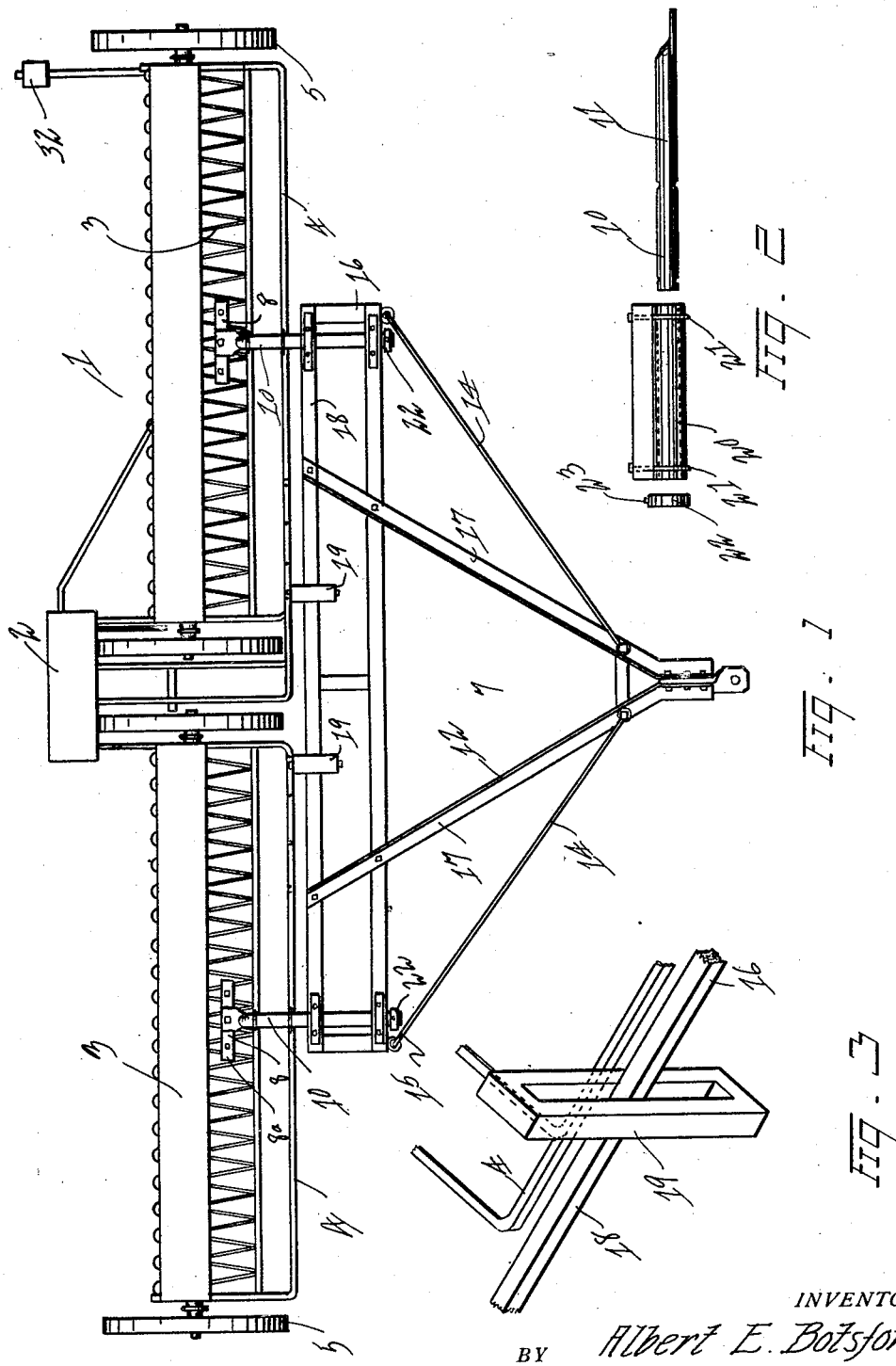
INVENTOR
BY *Albert E. Botsford*
*E. E. Lauge* ATTORNEY

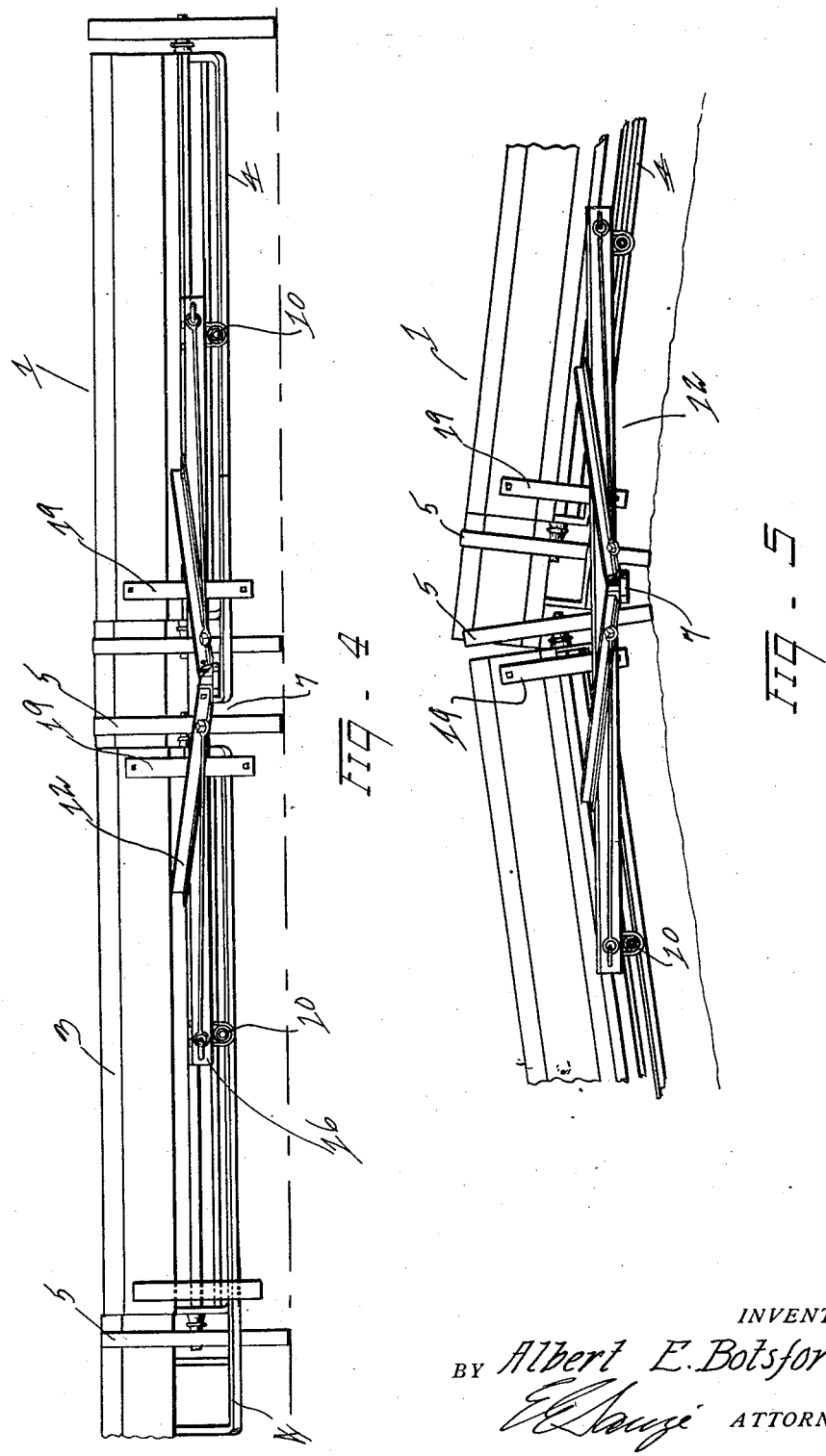

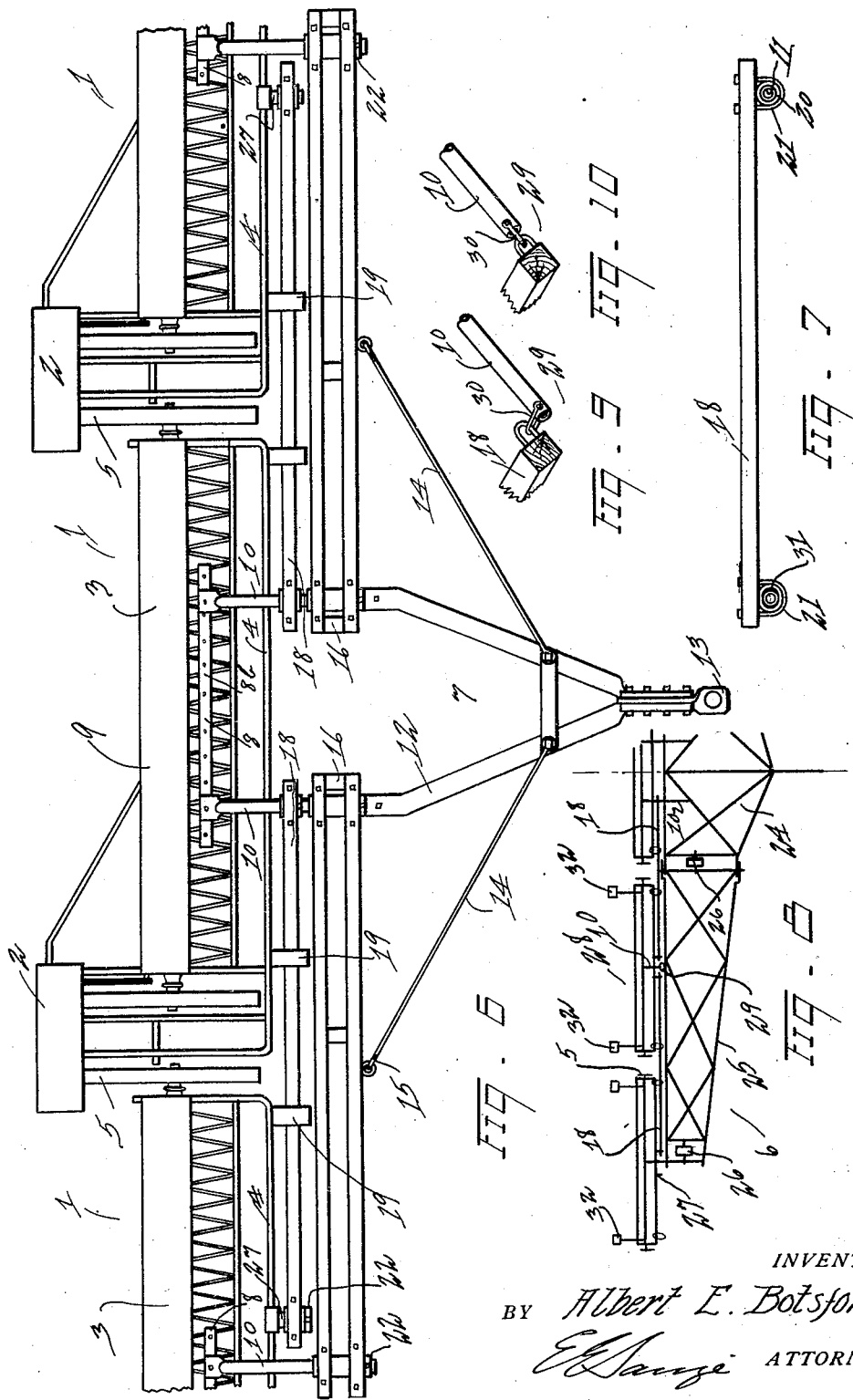

Patented Dec. 22, 1931

1,837,526

UNITED STATES PATENT OFFICE

ALBERT E. BOTSFORD, OF WALLA WALLA, WASHINGTON

STRAIGHT LINE IMPLEMENT COUPLING

Application filed May 19, 1930. Serial No. 453,622.

This invention relates to straight line implement couplings and has as one of its objects to provide an implement coupling, adapted for use where farming or other work is done on a large scale; where tractors afford a referred power; where the nature of the implements makes straight line arrangement; and where vertical flexibility is preferred owing to rolling or hilly ground.

Another object of the invention is to provide a straight line implement coupling having vertical flexibility that will permit implements to successfully operate with adjacent implements, on ground whose elevation is different for each implement, should occasion require.

A further object of the invention is to provide a straight line implement coupling that will successfully join a multitude of implements together and permit them to follow or cross irregular contours without effecting the draft.

A further object of the invention is to provide a straight line implement coupling that will permit the use of a single implement and that will permit the addition of other implements subsequently.

A further object of the invention is to provide a straight line implement coupling that will provide for a control draft to each implement without effecting its flexibility; that will maintain the alignment of the implements; and that will maintain the spacing apart of adjacent implements.

A further object of the invention is to provide a straight line implement coupling that is adapted for use with a truck.

A further object of the invention is to provide a straight line implement coupling that when used with a truck will permit the elimination of the truck wheels thereby lessening drag on turning corners.

A further object of the invention is to provide a straight line implement coupling that will shorten the usual space between the implements and the draft power thus preventing slewing down hill.

A further object of the invention is to provide a straight line implement coupling that will prevent a side walk action during operation of two wheeled implements.

A further object of the invention is to provide a straight line implement coupling whose parts and position thereof will readily adapt the implements to be moved in file formation.

With these and other objects in view, reference is now had to the accompanying drawings in which, Fig. 1 is a plan view of the device showing one form of the device as applied to two implements;

Fig. 2 is a side elevation of details of the pivot tongue;

Fig. 3 is a perspective detail of one of the alignment yokes;

Fig. 4 is a front elevation of the coupling, attached to two implements and the position of the coupling with relation to the implements when on level ground.

Fig. 5 is a similar view to that of Fig. 4 showing fragments of two implements on uneven ground and the relative position of the device under this condition of ground.

Fig. 6 is a plan view of a modified form of the device, adapted for use on an odd number of implements showing the use of an alignment rod and a coupling rod.

Fig. 7 is a front elevation of an alignment rod.

Fig. 8 shows in diagrammatic form a view of half of a section of five implements as connected with a truck, and illustrates the method of loose coupling between an inner implement and a rigid wing of a truck.

Fig. 9 shows a perspective view of the loose coupling with the pivot tongue in the dropped position; and Fig. 10 is a similar view to Fig. 9 showing the loose coupling as operating on even ground.

Having reference to the drawings, like numerals refer to like parts throughout the several views and the numeral 1 refers to an implement which is intended to represent typically any farm implement adapted to the device and forming the subject matter of this invention, but that is more specifically adapted to represent an implement used for seeding purposes, and which implement may be provided with an auxiliary seeder 2 forming the subject matter of my invention covering seeding implements filed March 11, 1930, Serial Number 434,955.

The typical implement will include the operating parts 3, shown incomplete in the drawings as it forms no part of this invention, a frame 4, and vehicle wheels 5.

As will be noted in the objects of these specifications, the prime object is flexibility in implements extended laterally end to end, forming a broad front in series designed to cover much territory in a single operation over the ground, and more particularly to the use of a tractor (not shown) providing the necessary power for the purpose.

It is recognized that many flexible connections are provided for this purpose, but heretofore a draft means has been provided of the nature of a truck 6 and owing to the wheels 5 of the adjacent implements necessarily requiring a space between the operating parts 3 of the implements it has been necessary to place the implements in staggered relation to provide for sufficient overlap in operation to eliminate this skip.

By so arranging the implements, the distance of the respective implements from the tractor varies, with a result that the implement farthest away from the tractor has greater swing to the right or left in the movement of the whole machine in any but a straight line on even ground and even when moving in a straight line when on a side hill, the hindermost implement in this case will slew down hill to a greater extent than the foremost implements, causing in the case of seeders, double sowing in certain parts and skips in other parts.

With the present device explained herein, the tractor is positioned close to the implements, a relatively closer distance than that as explained for the above arrangement, and this disposition of the implements in connection with the draft power, normally prevents slewing, whether the device is applied to seeders or when applied to such other implements as rakes, where a slight skip between the implements, due to the space occupied by the adjacent wheels of the respective implements, is immaterial.

In the first place the device is provided to be attached centrally to each implement and the means of attachment, being of a pivot or swivel nature, will permit the respective implements to move in a vertical plane about the connecting point of the adjacent implement and with an oscillatory movement in a vertical plane of each implement, independent of adjacent implements, by which arrangement ample movement of the implement oscillating in this manner, according to the contour of the ground over which it is drawn, will provide a maximum vertical movement of the implements with a minimum of vertical movement of a draft bar 7 of truck 6 intended to connect the implement with the tractor.

Next in importance is means to provide a fixed spacing between the implements so that the rows (or work) will be uniformly parallel and prevent the wriggling movement of implements having a broad front and being narrow from front to rear, and for this purpose the invention consists of a securing plate 8 rigidly and adjustably secured to each implement in a generally central position thereon which plate may be comparatively short as shown at 8a in Fig. 1, or may be comparatively long as shown at 8b in Fig. 6, the first mentioned plate 8a being adapted for use on other than the central or base implement 9 while the latter, 8b, may be adapted for use on the said base implement for a purpose to be presently explained.

Where implements are purchased one at a time and when purchased with the ultimate idea of using many of the implements straight in line, the first purchase may be equipped with the said elongated plate bolted as shown in Fig. 6 or otherwise rigidly and adjustably secured thereto, and to this plate will be rigidly and adjustably secured pivotal tongues 10 comprising tubular members 11 which are extended forward a convenient distance adapted to receive, on each of said tongues, some suitable means for connecting the implement with the tractor, a typical means being shown in this Fig. 6 consisting of a V shaped structure 12 extended forward and converging to a coupling plate 13 adapted for connection to the said tractor in the usual manner.

With this arrangement, adapted to draw one or any odd number of machines, the side braces 14 shown in this figure will not be utilized as they are unnecessary, as the general assembly ordinarily will provide ample strength, however if these are desirable, the ends 15 of these braces will be secured to the frame 4 of the machine, and by this means a complete implement will be provided that will be adapted to provide the base unit 9 upon which a completed structure will be fabricated.

In preparation for drawing an even number of implements, as shown in Fig. 1, a similar V shaped structure 12 may be attached to a framework which will take on the nature of a coupling frame 16, which frame may accommodate the said V shaped structure in a similar manner of assembly to that shown in Fig. 6 where the structure is coupled to the machine, or it may consist of angle irons 17, as shown in Fig. 1, bolted or otherwise secured to the coupling frame 16 or by any desired means or form suitable for the work intended, of forming a connecting means between the implements and the tractor.

For the purpose of attaching the coupling frame 16 to the two implements, obviously the elongated plate 8b may be retained if desired or two short plates 8a as shown in this Fig. 1 may be attached to the implements, and the two original pivot tongues 10 removed from the original machine with one tongue placed more centrally in the first implement and the second one placed in a similar manner on the second implement.

While it is desirable to attach these pivot tongues in a central position on the machines it is obvious that it is not absolutely essential that the connection be in the center, longitudinally of the machine, as the purpose of this tongue is to permit the respective implements to oscillate or move vertically according to the contour of the ground without materially effecting the elevation of the coupling frame 16, hence it is plainly evident that the exact positioning of these tongues on the implement is rather immaterial as long as the tongues are positioned to unite with the coupling frame and provide the proper spacing between the adjacent ends of said implements.

The coupling frame 16 in this arrangement includes an alignment bar 18, it being that part of the coupling frame 16 laying adjacent to and parallel with the front frame 4 of the implement, and attached to the frame of the implement preferably at the extreme end thereof is an alignment loop 19 adapted to slidably encircle this alignment bar 18 and forming a vertical guide that will maintain the said implements in positive alignment with each other and with the alignment bar.

These alignment loops 19 are shown plainly in Figs. 4 and 5 and are positioned vertically on the frame 4 and are extended both above and below the frame to accommodate the movement of the respective implements and the alignment bar to different respective positions, one of which being illustrated in Fig. 5.

By thus engaging the bar and in cooperation with the loop 19 an ideal guide is provided between the bar and implements, and by providing this arrangement throughout the series, and in conjoint operation with other cooperating frames 16, the series will be maintained in perfect alignment.

It is now plainly evident that the coupling frame 16, including the alignment bar 18 will maintain the spaced relation of the two implements without in any way interfering with their oscillations in meeting the ground conditions.

To permit of a free pivotal movement, the pivot tongue 10 may consist of a tubular tongue 11, adapted for securement to the plate 8, and a sleeve 20 adapted to be mounted on the tongue and for securement to the coupling frame 16 by means of U bolts 21, with a collar 22 and set screw 23 adapted for securement to the tongue 10 upon the end thereof protruding from the sleeve 20.

Obviously this sleeve 20 may consist of one or several sleeves as is desirable, and it is further obvious that the sleeve 20 may be utilized as the tongue if desired, the sleeve then being secured to the frame of the machine and the general order reversed.

Where three implements are used, as is illustrated in Fig. 6, the original base unit assembly 9 is preferred and a pair of oppositely extending coupling frames 16 may be pivotally connected to the pivot tongues 10 of the respective implements and these coupling frames may be identical with the coupling frame just described, and shown in Fig. 1, and may utilize its rear member as the alignment bar 18 and be secured to the respective implements by the alignment loop 19 just mentioned, but where further extensions are to be made, the coupling frame may be an independent member and a single alignment bar utilized to maintain the alignment of the implements to suit conditions as will be hereinafter mentioned.

When three implements are in line as shown in this Fig. 6, the coupling frame shown in Fig. 1 (obviously without the draft means attached) will provide an ideal coupling and alignment means, but where additional implements are to be drawn which require a substantial framework to provide an equal draft for all of the implements, and as represented in the diagram of Fig. 8, in which case this framework may consist of the usual truck 6 comprising a center draft member 24 to which is hingedly attached a wing 25 on either side of the draft member, (one wing only being shown), with this framework ordinarily being supported by wheels 26 mounted within the framework and distributed as shown to support the structure, now for the purpose of alignment and connection with the truck 6, the V shaped draft member will be removed from the center or base implement and the draft member 24 of the truck 6 be secured thereto in its stead and in a like or other manner, while a single alignment bar 18 consisting of an elongated bar, provided with sleeves 20 to engage the pivot tongues 10, will be threaded through the alignment loops 19 to be pivoted upon the original pivot tongues, or pairs of special pivots 27 as shown in Fig. 6 and in the diagram in Fig. 8.

In this arrangement and where the wing 25 of the truck 6 is not hinged opposite an intermediate implement 28 directly in line with its pivot tongue, the connection 29 shown in Figs. 9 and 10 is provided for the purpose of permitting this intermediate implement to raise and lower with respect to the wing, hence the oscillating movement as well as its movement vertically as a whole will be unaffected, which connection may consist of a clevis 30 hinged horizontally to said tongue 10.

It now becomes obvious by reference to the Figs. 6 and 8 that the centers of the implements remain an unvariable distance apart, while the special pivots 27 are movable and off center according to the oscillations of the different implements, and by this movement the distance between these two centers will vary, and to compensate for this variation the sleeve used to engage the special pivots as shown in Fig. 7, is provided with an elongated opening 31 which elongation will permit of the variation in length between centers during oscillations.

By this means it is now plainly evident that any number of implements may be coupled together and maintained a positive distance apart and also in a true straight in line position by means of the pivot member and the alignment loops 19, and the alignment bar 18 which passes through the loops for pivotal connection with the pivot members 10 and 27 respectively.

The entire length of the whole machine is only restricted by its draft means or truck.

Again referring to Fig. 8 it will be noted that the truck wheels 26 are illustrated as being fixed, and while this apparently will not affect the power necessary for draft purposes, in actual practice it has been found that these wheels sink into the soft seed bed to an extent that the dirt falls in around them requiring considerable additional power to overcome the resistance due to their efforts in trying to climb out of the ruts so formed, and it is also a recognized fact that the packed dirt in the path of these wheels will be shown when the grain is ready to cut either by the grain therein extending above or below the bordering grain, in either event rendering cutting more difficult of operation, and to overcome this effect counter-weights represented as at 32 in Fig. 8 are provided on the rear of the implements.

These counter-weights are intended to overcome this effect by lightening the load on these wheels 26 and under certain conditions, as where a truck 6 is used on three or four machines, the wheels may be entirely removed and the truck wholly supported at its rear end by the wheels 5 of the implements 1 and its front end by the tractor.

Whether these truck wheels are fixed as above mentioned or where castor wheels are employed, there is a tendency to slew down hill with this arrangement, and by the removal of these wheels this tendency is considerably relieved.

In use the device is assembled as above described and by means of power of any nature the device is drawn over the ground to be worked, and owing to its flexibility the various implements will conform strictly to the nature of the ground and much ground may be covered.

If on a sidehill, where the inclination is very great, should there be a tendency to slew, all implements will slew together, and should any skips inadvertently remain, the skips naturally will be very small and will only occur in proportion to one of several implements, as against several to each implement, thereby providing a piece of work that is practically perfect.

Obviously the extending tongues from each implement provided for coupling the implements together in a line, or in other words in a file one behind the other, the tongue of the implement being secured by any flexible means to its forward fellow whereby all of the implements can be simultaneously moved through gates or over narrow roads or the like.

Having thus described my invention, I claim:

1. A method of straight line coupling for implements consisting of pivotally coupling a plurality of implements together, one from the other and from the centers of the respective implements, providing for a pivotal movement independent of the pivotal coupling to provide vertical flexibility perpendicular to their line of travel, and controlling their vertical movement to maintain their lateral alignment and their distance apart laterally.

2. In a straight line coupling for implements, a plurality of implements, forwardly extending pivotal tongues rigidly attached to each of said implements, alignment loops mounted on said implements, and a coupling frame pivotally mounted on said tongues and adapted to maintain the spaced relation of said implements, and cooperable with said loops to maintain the alignment thereof.

3. In a straight line coupling for implements, a plurality of implements, a securing plate rigidly secured to each of said implements, forwardly extending pivotal tongues rigidly attached to said plates, alignment loops attached to said implements adjacent their respective ends and a coupling frame pivotally mounted on said tongues to join said implements and provided with an alignment bar, cooperatively engaged by said alignment loops, said frame and said bar respectively being adapted to maintain the spaced relation and the alignment of said implements.

4. In a straight line coupling for implements, a plurality of implements, a securing plate adjustably secured to each of said implements, a pivotal tongue mounted on said implements and rigidly secured to each of said securing plates, alignment loops, a coupling frame pivotally mounted on said tongues and provided with an alignment bar positioned in parallel relation to said implements, said bar being cooperable with said loops to maintain the alignment of said implements, and said coupling frame being adapted to maintain the spaced relation of said implements, and adapted for conjoint operation with other frames of a series, and to accommodate a draft means.

5. In a straight line coupling for implements, a plurality of implements, a securing plate adjustably and centrally attached to each of said implements, a pivotal tongue mounted on each of said plates, a coupling frame pivotally mounted on said tongues and adapted to maintain the spaced relation of the implements, a special pivot attached centrally to each of said implements and an alignment bar pivotally attached to said special pivots and provided with alignment loops engageable with said implements and disposed to maintain the straight in line alignment of said implements.

6. In a straight line coupling for implements, a plurality of implements positioned to provide a laterally extended series, securing plates adjustably attached to each of said implements, pivotal tongues mounted on and adjustable with said plates, and comprising extended tubular members, alignment loops rigidly attached to the front of each of said implements, a pair of special pivots attached centrally to each of said implements, an alignment bar mounted in said alignment loops and pivotally attached to each of said special pivots and disposed to maintain the straight in line alignment of said implements, and sleeves adapted for securement to a draft means for cooperation with said tongues to provide a connecting means between said tongues and said draft means.

7. In a straight line coupling for implements, a plurality of implements positioned to provide a laterally extended series, securing plates adjustably attached to each of said implements, pivotal tongues mounted on and adjustable with said plates, and comprising extended tubular members, alignment loops, a pair of special pivots attached centrally to each of said implements and positioned off center with respect to said tongues, an alignment bar mounted in said alignment loops and consisting of an elongated bar having sleeves attached to the ends of said bar for pivotal attachment to said special pivots and having one of said sleeves adapted to compensate for the movement of said special pivot about said pivotal tongue during oscillation of said implement, said bar being disposed to maintain the alignment of said implements.

8. In a straight line coupling for implements, a plurality of implements, in combination with a truck, a tongue attached centrally to each of said implements and extended forward for pivotal attachment with said truck, said pivotal attachment being adapted to permit oscillation of each of said implements independent of the other of said implements, special pivots mounted adjacent to the tongue, an alignment bar pivotally mounted on said special pivots and extended from one of said implements to an adjacent implement and adapted to maintain the spaced relation of said implements, means associated with said bar and said implements to maintain the aligned relation of the implements with said bar, and a counterbalance mounted on said implement and positioned and adapted to balance the weight of the truck.

In testimony whereof I have affixed my signature.

ALBERT E. BOTSFORD.